United States Patent
Ho

(10) Patent No.: US 12,007,804 B2
(45) Date of Patent: Jun. 11, 2024

(54) DISPLAY FINE-ADJUSTMENT DEVICE

(71) Applicant: OXTI Pte Ltd, Singapore (SG)

(72) Inventor: Chih-Feng Ho, Singapore (SG)

(73) Assignee: OXTI PTE LTD, Singapore (SG)

( * ) Notice: Subject to any disclaimer, the term of this patent is extended or adjusted under 35 U.S.C. 154(b) by 193 days.

(21) Appl. No.: 17/838,277

(22) Filed: Jun. 13, 2022

(65) Prior Publication Data
US 2023/0400879 A1  Dec. 14, 2023

(51) Int. Cl.
*G06F 1/16* (2006.01)
*F16M 11/12* (2006.01)

(52) U.S. Cl.
CPC .......... *G06F 1/1601* (2013.01); *F16M 11/121* (2013.01); *F16M 2200/06* (2013.01); *G06F 2200/1613* (2013.01)

(58) Field of Classification Search
CPC ........... G06F 1/1601; G06F 2200/1613; G06F 3/017; G06F 2200/1612; G06F 1/1605; G06F 1/1607; F16M 11/121; F16M 2200/06; F16M 11/10; F16M 11/18
See application file for complete search history.

(56) References Cited

U.S. PATENT DOCUMENTS

| | | | | |
|---|---|---|---|---|
| 4,447,031 A * | 5/1984 | Souder, Jr. | ......... | F16M 11/2014 248/921 |
| 4,834,329 A * | 5/1989 | Delapp | ................. | F16M 11/10 248/183.3 |
| 4,846,434 A * | 7/1989 | Krogsrud | ............... | F16M 13/02 248/123.11 |
| 6,134,103 A * | 10/2000 | Ghanma | ............... | G06F 1/1681 248/920 |
| 6,554,238 B1 * | 4/2003 | Hibberd | ............... | F16M 11/041 248/278.1 |
| 7,035,092 B2 * | 4/2006 | Hillman | ................. | F16M 11/40 361/679.06 |
| 7,142,415 B2 * | 11/2006 | Hillman | ............. | F16M 11/2078 285/146.1 |
| 7,209,344 B2 * | 4/2007 | Hillman | ............. | F16M 11/2078 361/679.21 |
| 7,773,371 B2 * | 8/2010 | Hillman | ................. | F16M 11/08 361/679.06 |
| 7,780,124 B2 * | 8/2010 | Wang | ....................... | H04N 5/64 362/135 |

(Continued)

*Primary Examiner* — Lisa Lea-Edmonds
(74) *Attorney, Agent, or Firm* — Leong C. Lei

(57) ABSTRACT

A display fine-adjustment device includes a display and a driving mechanism, the display being drivable by the driving mechanism to rotate; a support frame, which is connected to the display and includes supporting arms rotatably interconnected for being switchable between a folded condition and an expanded condition; and a sensor, which is electrically connected to the driving mechanism. A user manually pulls the support frame from the folded condition to the expanded condition to make the display fast approach the user and uses the sensor to detect the user and use the driving mechanism to drive the display to rotate to have the display facing the user, achieving an advantage of being time-saving and easy. In case of being not in use, folding can be made for space saving, while in use, the function of fine angle adjustment is performable to adjust the display to the most comfortable viewing angle.

5 Claims, 6 Drawing Sheets

(56) References Cited

U.S. PATENT DOCUMENTS

| | | | | |
|---|---|---|---|---|
| 7,780,131 B2* | 8/2010 | Oh | ............................ | G09F 7/20 |
| | | | | 248/917 |
| 8,201,781 B2* | 6/2012 | Parsons | .............. | F16M 11/2071 |
| | | | | 362/11 |
| 9,133,975 B2* | 9/2015 | Kelch | .................... | F16M 13/02 |
| 9,256,249 B2* | 2/2016 | Truong | ................. | G06F 1/1601 |
| 10,845,913 B1* | 11/2020 | Aaron | ................... | G06F 3/0418 |
| 11,118,729 B2* | 9/2021 | Zebarjad | ............. | F16M 13/022 |
| 2003/0015632 A1* | 1/2003 | Dunn | ..................... | F16M 11/10 |
| | | | | 248/122.1 |
| 2004/0178312 A1* | 9/2004 | Parsons | .................. | F21S 8/043 |
| | | | | 248/286.1 |
| 2004/0257755 A1* | 12/2004 | Hillman | ................ | F16M 11/40 |
| | | | | 361/679.06 |
| 2005/0036283 A1* | 2/2005 | Hillman | ................ | F16M 11/10 |
| | | | | 248/278.1 |
| 2022/0252209 A1* | 8/2022 | Newville | ............... | F16M 11/24 |
| 2023/0016449 A1* | 1/2023 | Newville | ................. | A47F 5/08 |
| 2023/0400143 A1* | 12/2023 | Ho | ..................... | F16M 11/2092 |
| 2023/0400879 A1* | 12/2023 | Ho | ........................ | F16M 11/18 |

\* cited by examiner

DISPLAY FINE-ADJUSTMENT DEVICE

TECHNICAL FIELD OF THE INVENTION

The present invention relates generally to a display fine-adjustment device, and more particularly to a display fine-adjustment device that includes automatic tracking.

DESCRIPTION OF THE PRIOR ART

In the use of a screen 100, it is most appropriate that the screen 100 is kept at an angle of 90 degrees with respect to the eyesight and the viewing angle is kept between 15 and 25 degrees. Reference being had to FIG. 1, the screen 100 generally has a best viewing angle range θ, and when a user A is watching the screen within the best viewing angle range θ, the exhibition of the image on the screen 100 would be the best. For a user B who is watching the screen outside the best viewing angle range θ, the image on the screen 100 would be distorted or being not clear.

A known liquid crystal display rotating structure disclosed in Taiwan Patent No. 534422 interfaces between a backplane of the liquid crystal display and a support frame, so that the liquid crystal display is allowed to make adjustment through rotation up to a maximum range of 360 degrees, realizing arbitrary tilting and rotating of the liquid crystal display by following a direction of force applied manually by a user.

However, manual adjustment is simply rough, unprecise adjustment. In addition, when a user is of reduced mobility, it is hard to do adjustment of the screen 100 in such a manual way. Further, such a way of adjustment does not enable automatic determination as to whether being located with the best viewing angle range or not for timely performing readjustment of the display.

SUMMARY OF THE INVENTION

To achieve the above purpose, the present invention provides a display fine-adjustment device, which comprises: a display, which is drivable by a driving mechanism to rotate; a support frame, which is connected to the display, the support frame comprising a plurality of supporting arms that are rotatably interconnected, the support frame being switchable between a folded condition and an expanded condition; and a sensor, which is electrically connected to the driving mechanism.

In the display fine-adjustment device, the driving mechanism comprises a motor controller, at least one motor, and at least one axle. The at least one axle is connected to the display, and the motor controller is operable to control the at least one motor to drive the at least one axle to drive the display to rotate.

In the display fine-adjustment device, the sensor comprises an image sensor.

In the display fine-adjustment device, the plurality of supporting arms are rotatably interconnected by a rotation axle.

In the display fine-adjustment device, the sensor is arranged on the display or the support frame.

As such, a user may manually pull the support frame from the folded condition to the expanded condition to make the display fast approach the user and may also use the sensor to detect the user and use the driving mechanism to drive the display to rotate for a minute extent, so as to have the display facing the user, achieving a practical advantage of being time-saving and easy. In case of being not in use, folding can be made for space saving, while in use, the function of fine angle adjustment is performable to adjust the display to the most comfortable viewing angle.

DETAILED DESCRIPTION OF THE PREFERRED EMBODIMENT

Figure 1:
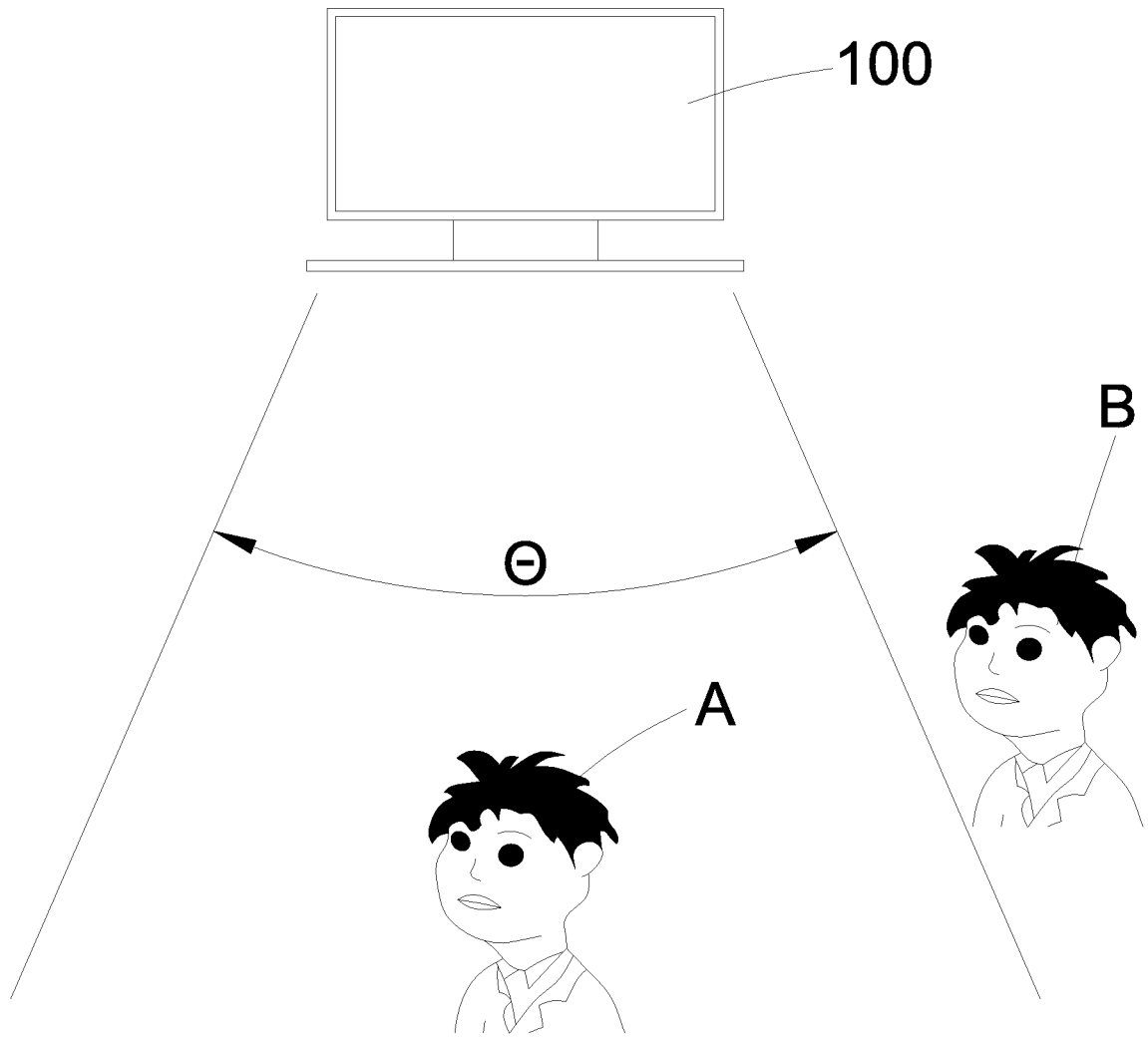
FIG. 1 is a schematic view illustrating a best viewing angle range of the prior art.
Figure 2:
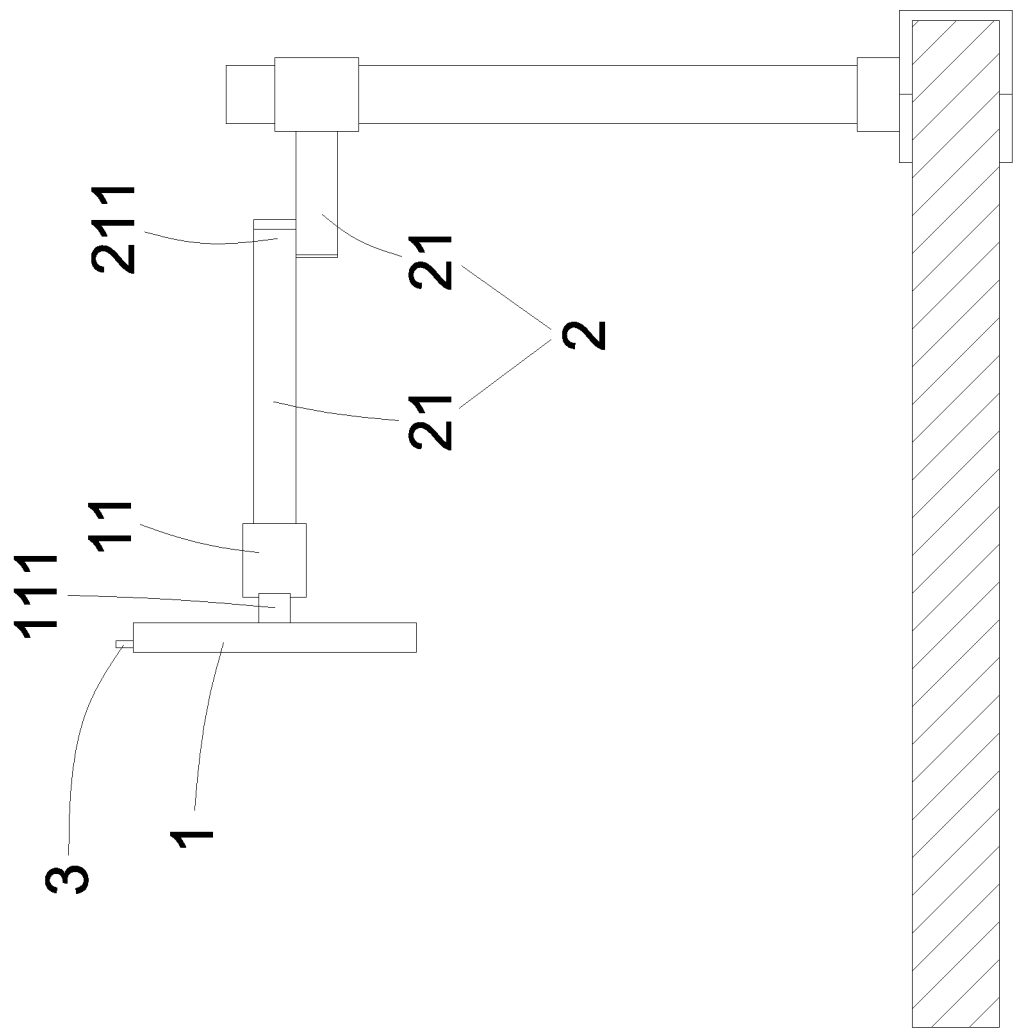
FIG. 2 is a schematic view showing a display fine-adjustment device according to the present invention.

Referring to FIG. 2, the present invention provides a display fine-adjustment device, which comprises: a display 1, a support frame 2, and a sensor 3.

The display 1 is drivable by a driving mechanism 11 to rotate. Specifically, the driving mechanism 11 may comprise a motor controller, at least one motor, and at least one axle 111. The at least one axle 111 is connected to the display 1. The motor controller is operable to control the at least one motor to drive the at least one axle 111 to drive the display 1 to rotate. For example, a first motor and a first axle (which serves as a horizontal rotating axle of the display 1 to allow the display 1 to rotate upwards/downwards about a center defined by the first axle) may be provided to enable the display 1 to rotate upwards/downwards, and additionally or alternatively, a second motor and a second axle (which serves as a vertical rotating axle of the display 1 to allow the display 1 to rotate leftwards/rightwards about a center defined by the second axle) may be provided to enable the display 1 to rotate leftwards/rightwards, so that the display may possess both functions of rotating upwards/downwards and rotating leftwards/rightwards.

Figure 3:
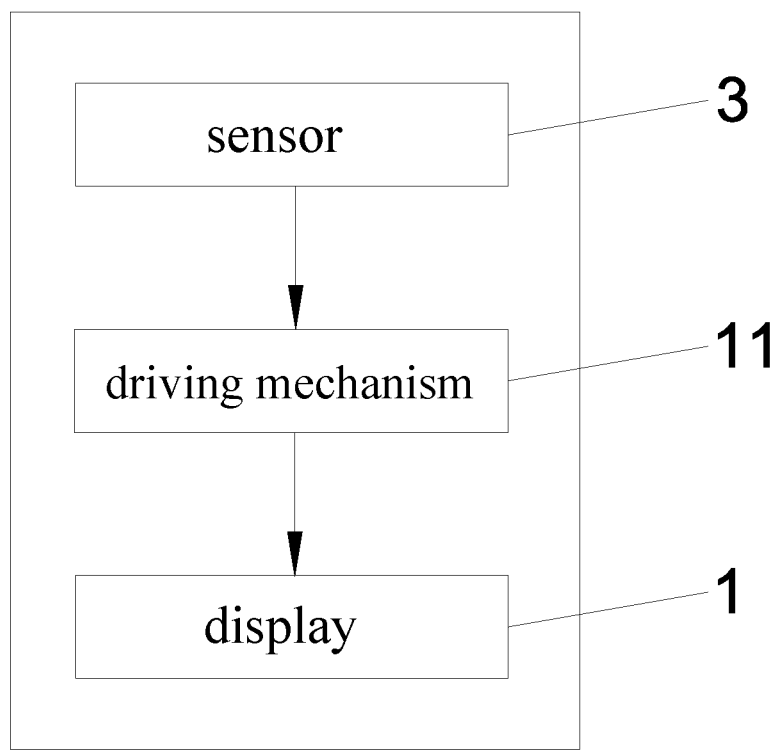
FIG. 3 is a block diagram showing a sensor, a driving mechanism, and a display of the present invention.
Figure 4:
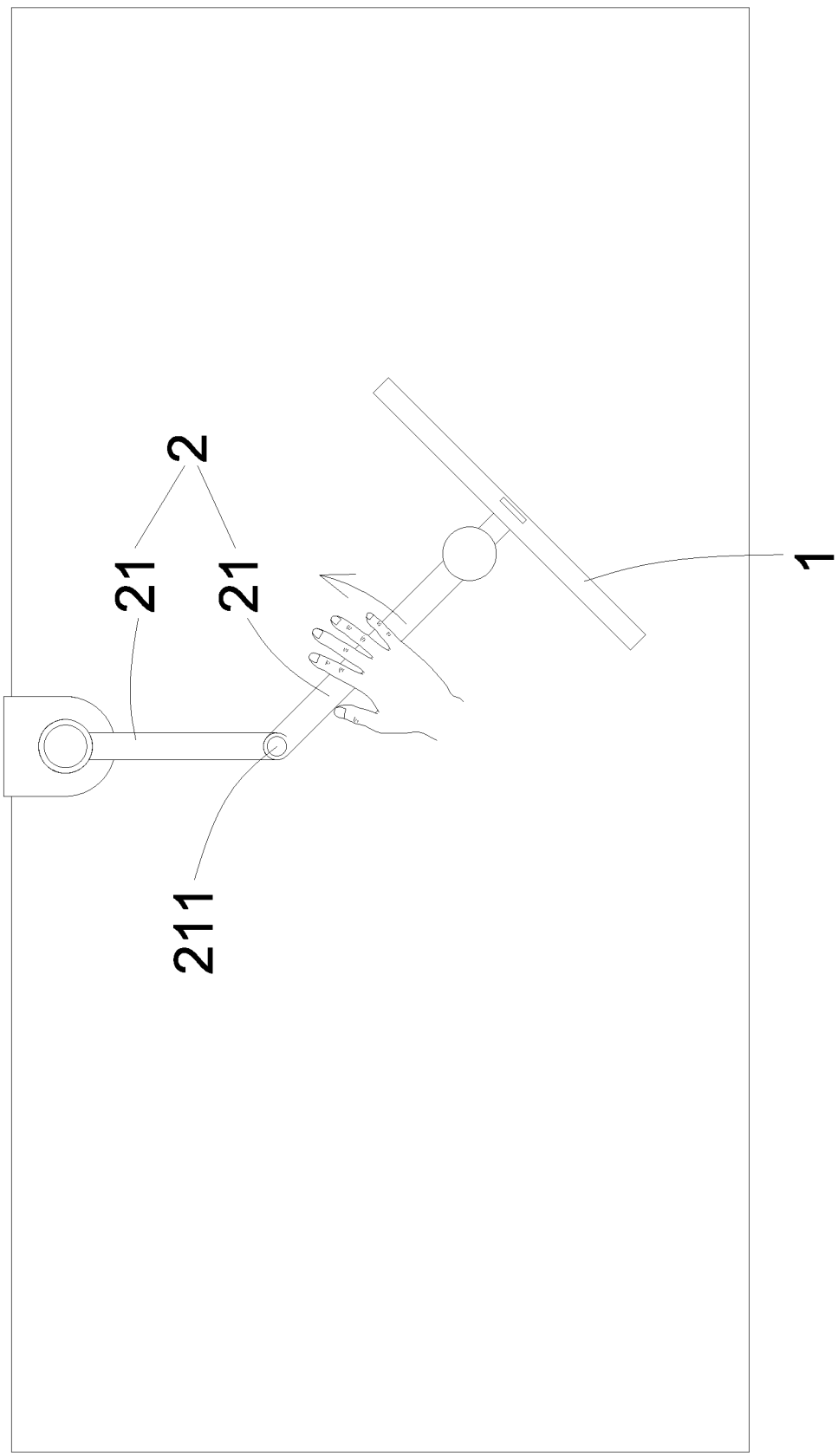
FIG. 4 is a schematic view demonstrating a user manually pulling a support frame of the present invention from a folded condition to an expanded condition.

Referring to FIGS. 3 and 4, the support frame 2 and the display 1 are connected to each other. The support frame 2 comprises a plurality of supporting arms 21 that are rotatably interconnected, and the support frame 2 is switchable between a folded condition and an expanded condition. Specifically, the interconnection between the plurality of supporting arms 21 is achieved by means of a rotation axle 211.

The sensor 3 is electrically connected to the driving mechanism 11. Specifically, the sensor 3 functions to detect a user. The sensor 3 may be an image sensor, which captures an image of a face and is operable to apply facial recognition technology to identify a position of a face according to distances among the eyebrows, the eyes, the nose, the teeth, and the mouth so as to identify an orientation of the head. The orientation of the head can be for example head upwards, head downwards, head leftwards, or head rightwards. The sensor 3 may then transmit information of the position of the face and the orientation of the head toward the driving mechanism 11. The sensor 3 is arrangeable on the display 1 or the support frame 2.

Figure 5:
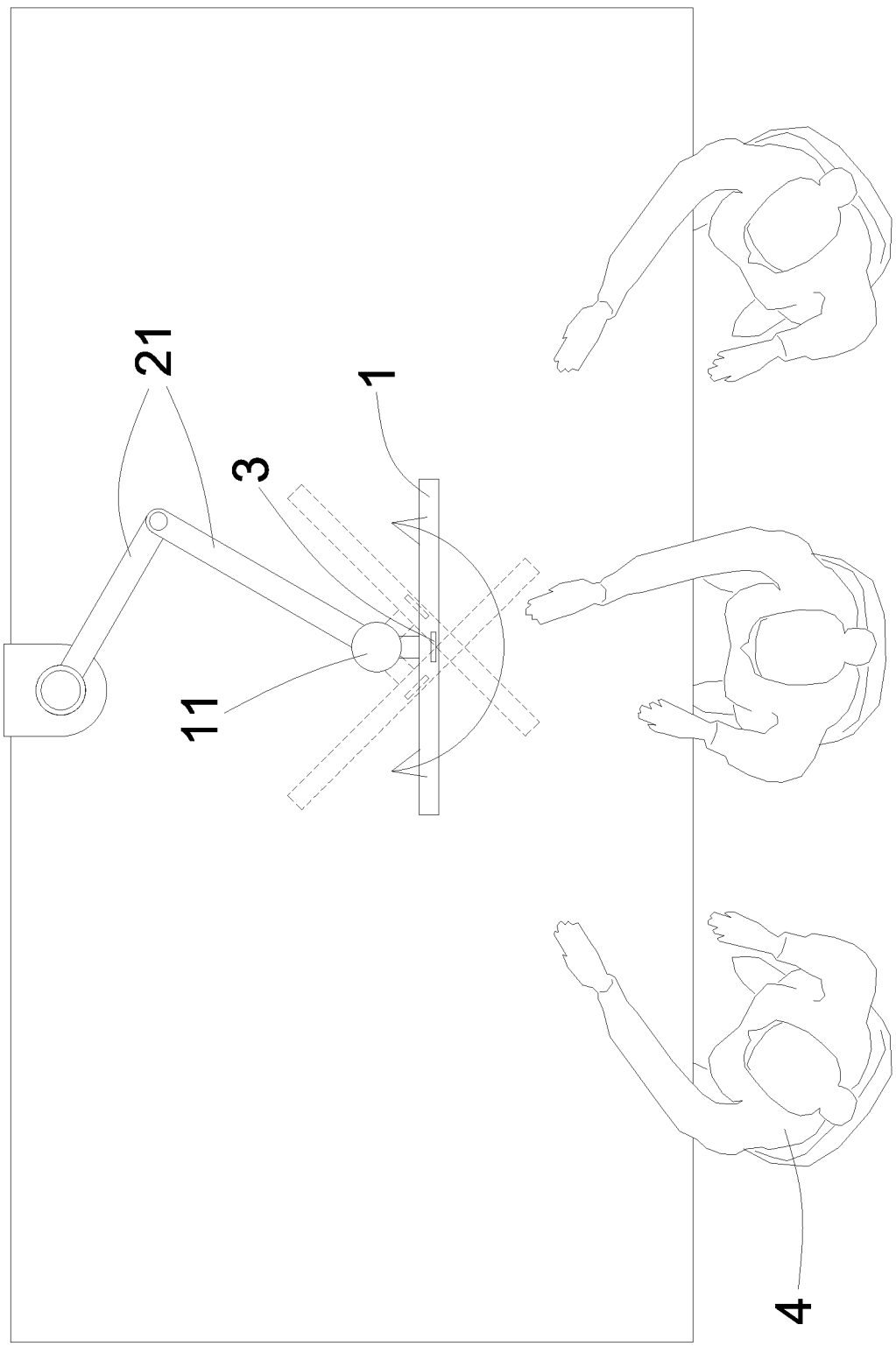
FIG. 5 is a schematic view demonstrating the display rotating for a minute extent.
Figure 6:
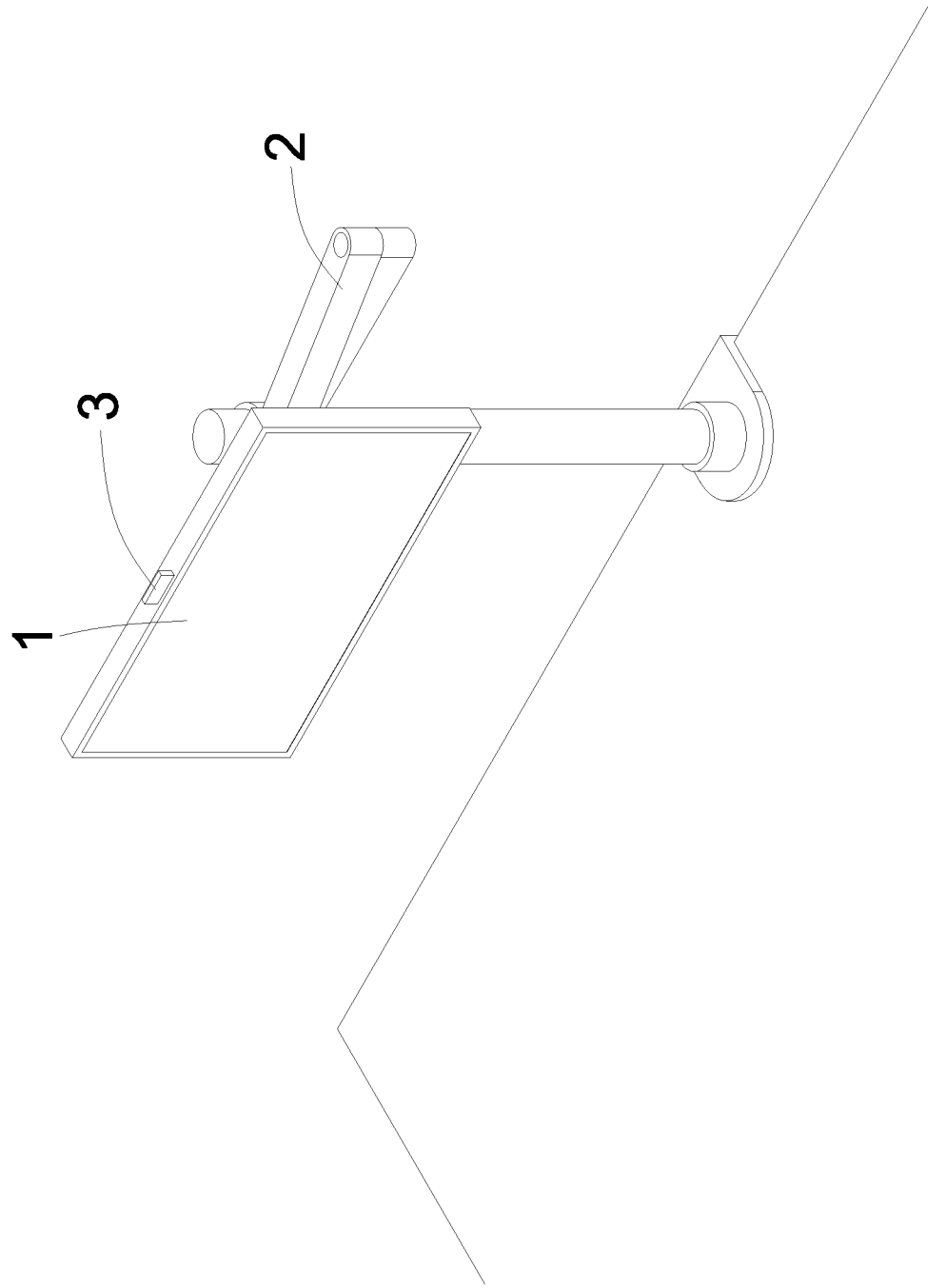
FIG. 6 is a schematic view demonstrating the support frame of the present invention set in the folded condition.

Referring to FIGS. 5 and 6, in use of the present invention, firstly, a user 4 is located in front of the display 1 and manually pulls the support frame 2 from the folded condition to the expanded condition to make the display 1 approaching the user 4. Further, the sensor 3 detects the user 4, and the driving mechanism 11 drives the display 1 to do rotation for a minute extent, so as to have the display 1 facing the user, achieving a practical advantage of being time-saving and easy. In case of being not in use, folding can be made for space saving, while in use, the function of fine angle adjustment is performable to adjust the display to the most comfortable viewing angle.

As an example of illustration, the first motor and the first axle may be used as a horizontal rotating axle of the display 1, in order to allow the display 1 to rotate upwards/downwards about a center defined by the first axle to thereby enable the display 1 to rotate upwards/downwards for setting the display 1 and the eyesight of the user in a range of 15-25 degrees (where the locations of the eyes of the face can be recognized through the human face recognition technology). Further, the second motor and the second axle may be used as a vertical rotating axle of the display 1 to allow the display 1 to rotate leftwards/rightwards about a center defined by the second axle to thereby enable the display 1 to rotate leftwards/rightwards for setting the display 1 to exactly face the user.

As such, the user may manually pull the support frame 2 from the folded condition to the expanded condition to make the display 1 fast approach the user and may also use the sensor 3 to detect the user and use the driving mechanism 11 to drive the display 1 to rotate for a minute extent, so as to have the display 1 facing the user, achieving a practical advantage of being time-saving and easy. In case of being not in use, folding can be made for space saving, while in use, the function of fine angle adjustment is performable to adjust the display to the most comfortable viewing angle.

I claim:

1. A display fine-adjustment device, comprising:
   a display, which is drivable by a driving mechanism to rotate;
   a support frame, which is connected to the display, the support frame comprising a plurality of supporting arms that are rotatably interconnected, the support frame being switchable between a folded condition and an expanded condition; and
   a sensor, which is electrically connected to the driving mechanism.

2. The display fine-adjustment device according to claim 1, wherein the driving mechanism comprises a motor controller, at least one motor, and at least one axle, the at least one axle being connected to the display, the motor controller being operable to control the at least one motor to drive the at least one axle to drive the display to rotate.

3. The display fine-adjustment device according to claim 1, wherein the sensor comprises an image sensor.

4. The display fine-adjustment device according to claim 1, wherein the plurality of supporting arms are rotatably interconnected by a rotation axle.

5. The display fine-adjustment device according to claim 1, wherein the sensor is arranged on the display or the support frame.

\* \* \* \* \*